US009374235B2

(12) United States Patent
Gu et al.

(10) Patent No.: US 9,374,235 B2
(45) Date of Patent: Jun. 21, 2016

(54) METHOD FOR IMPLEMENTING COMMUNICATION BETWEEN DIFFERENT NETWORKS AND APPARATUS

(75) Inventors: Dujuan Gu, Beijing (CN); Sheng Jiang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 135 days.

(21) Appl. No.: 13/564,561

(22) Filed: Aug. 1, 2012

(65) Prior Publication Data

US 2012/0297086 A1    Nov. 22, 2012

Related U.S. Application Data

(63) Continuation of application No. PCT/CN2011/070731, filed on Jan. 28, 2011.

(30) Foreign Application Priority Data

Feb. 2, 2010    (CN) .......................... 2010 1 0107282

(51) Int. Cl.
| | |
|---|---|
| *G06F 15/16* | (2006.01) |
| *H04L 12/18* | (2006.01) |
| *H04L 29/12* | (2006.01) |
| *H04L 29/06* | (2006.01) |

(52) U.S. Cl.
CPC ........ *H04L 12/1836* (2013.01); *H04L 61/2069* (2013.01); *H04L 61/251* (2013.01); *H04L 69/167* (2013.01)

(58) Field of Classification Search
CPC ..................... H04L 12/4608; H04L 29/12367; H04L 65/4076; H04L 12/1836; H04L 29/06; H04L 29/12358; H04L 29/1282; H04L 61/251; H04L 61/6013; H04L 61/1535; H04L 61/2514; H04L 61/2575; H04L 65/1069; H04W 4/02; H04W 80/04
USPC .................................. 709/227, 230, 249, 238
See application file for complete search history.

(56) References Cited

U.S. PATENT DOCUMENTS

| | | | | |
|---|---|---|---|---|
| 7,467,214 | B2* | 12/2008 | Chin ............................. | 709/230 |
| 7,577,141 | B2* | 8/2009 | Kamata et al. ................ | 370/390 |

(Continued)

FOREIGN PATENT DOCUMENTS

| | | |
|---|---|---|
| CN | 101005390 A | 7/2007 |
| CN | 101068226 A | 11/2007 |

(Continued)

OTHER PUBLICATIONS

Written Opinion of the International Searching Authority dated May 5, 2011 in connection with International Patent Application No. PCT/CN2011/070731.

(Continued)

*Primary Examiner* — Edward Kim (57) ABSTRACT

Embodiments of the present invention disclose a method for implementing communication between different networks, where the method includes: receiving a multicast data obtaining request supporting a first network protocol, and determining multicast data identity information (MDID) of multicast data that needs to be obtained; obtaining, according to the MDID, in a multicast manner and from a network device supporting a second network protocol, the multicast data that needs to be obtained, and buffering the multicast data that needs to be obtained; establishing, for the multicast data that needs to be obtained, a multicast group supporting the first network protocol; and sending the multicast data that needs to be obtained by a user apparatus to the user apparatus which joins the multicast group supporting the first network protocol.

10 Claims, 3 Drawing Sheets

(56) References Cited

U.S. PATENT DOCUMENTS

| | | | |
|---|---|---|---|
| 2002/0026482 A1* | 2/2002 | Morishige et al. | 709/206 |
| 2003/0225900 A1 | 12/2003 | Morishige et al. | |
| 2005/0015507 A1* | 1/2005 | Chin | 709/230 |
| 2005/0021833 A1 | 1/2005 | Hundscheid et al. | |
| 2007/0171926 A1 | 7/2007 | Rachwalski et al. | |
| 2007/0171930 A1* | 7/2007 | Kamata et al. | 370/432 |

FOREIGN PATENT DOCUMENTS

| | | | |
|---|---|---|---|
| CN | 101090327 | A | 12/2007 |
| CN | 101137045 | A | 3/2008 |
| CN | 101222425 | A | 7/2008 |
| CN | 101321152 | A | 12/2008 |
| CN | 101471800 | A | 7/2009 |
| EP | 2 166 762 | A1 | 3/2010 |
| JP | 2001-285357 | A | 10/2001 |
| JP | 2004-007655 | A | 1/2004 |
| JP | 2007158662 | A | 6/2007 |

OTHER PUBLICATIONS

Behcet Sarikaya, "Simplified Route Optimization for PMIPV6 Local Routing", U.S. Appl. No. 61/156,609, filed Mar. 2, 2009.

Supplementary European Search Report dated Sep. 28, 2012 in connection with European Patent Application No. EP 11 73 9388.4, 14 pages.

K. Tsuchiya et al., "An IPv6/IPv4 Multicast Translator based on IGMP/MLD Proxying (mtp)", Feb. 19, 2003, 15 pages.

Kazuaki Tsuchiya, "An IPv6/IPv4 Multicast Proxy—Translator", 52nd IETF MAGMA meeting, Dec. 2001, 6 pages.

S. Venaas, et al., "An IPv4-IPv6 multicast translator", Jul. 8, 2009, 11 pages.

S. Jiang, et al., "Multicast Proxy in IPv6/IPv4 Transition", Jan. 7, 2011, 8 pages.

S. Venaas, et al., "Framework for IPv4/IPv6 Multicast Translation", Oct. 24, 2009, 22 pages.

Huan G., et al., "Research of RTSP Streaming Proxy Supporting IPv4/IPv6 Multicast Intercommunication", vol. 17, No. 6, Jun. 2007, 11 pages.

"Multicast IPv4-IPv6 transition technology", Apr. 30, 2006, 16 pages.

International Search Report dated May 5, 2011 in connection with International Patent Application No. PCT/CN2011/070731.

S. Venaas, "An IPv4-IPv6 multicast gateway", draft-venaas-mboned-v4v6mcastgw-00.txt, Feb. 2003, 7 pages.

* cited by examiner

METHOD FOR IMPLEMENTING COMMUNICATION BETWEEN DIFFERENT NETWORKS AND APPARATUS

CROSS-REFERENCE TO RELATED APPLICATIONS

This application is a continuation of International Application No. PCT/CN2011/070731, filed on Jan. 28, 2011, which claims priority to Chinese Patent Application No. 201010107282.7, filed on Feb. 2, 2010, both of which are hereby incorporated by reference in their entireties.

TECHNICAL FIELD

The present invention relates to the field of communications, and in particular to a method for implementing communication between different networks and an apparatus.

BACKGROUND

Currently, the IPv6 (Internet Protocol version 6) is regarded as a core standard of the next generation Internet. In the next generation Internet, it is confirmed that the IPv6 has to support multicast, and possess a large number of multicast address space. After the IPv6 is put into application, more and more pure IPv6 nodes appear. However, due to a huge scale of an existing IPv4 (Internet Protocol version 4) Internet network, the IPv6 protocol network is not going to replace the existing IPv4 network overnight. Many IPv4 nodes still persist because of their successful operation. Therefore, the evolution of the network is certainly smooth and progressive, and the IPv6 network and the IPv4 network inevitable coexist for a long time in future Internet. During the long coexistence, according to an IPv6 deployment strategy, pure IPv6 networks keep emerging regionally. In this case, the pure IPv4 network and the pure IPv6 network coexist and interlace with each other in the network.

Therefore, a mechanism is required to ensure direct communication between a pure IPv4 node and a pure IPv6 node to realize a smooth transition. At present, quite a number of transitional technologies for unicast interworking have been proposed; however, they are only applicable to unicast communication, but not applicable to multicast communication. At present, no authoritative interworking transitional scheme is provided in the aspect of multicast. However, multicast applications such as IPTV (Internet Protocol Television, Internet protocol television) video are widely deployed. Therefore, when the IPv4 and the IPv6 coexist, how to achieve the interworking between these multicast applications is a key problem that needs to be solved, and multicast interworking ability needs to be effectively provided.

At present, an IPv4-IPv6 multicast protocol conversion technology exists in the prior art, where the technology may use an ordinary IPv6 multicast protocol to communicate with any multicast group supporting the IPv4 protocol without changing an infrastructure. Its core idea is: one or multiple IPv4-IPv6 multicast conversion apparatuses are placed on a path between a source using one IP protocol and a destination using another IP protocol. The IPv4-IPv6 multicast conversion apparatus performs conversion between IPv4 and IPv6 multicast, and performs conversion between an IPv4 multicast packet and an IPv6 multicast packet. A one-to-one mapping relationship between IPv4 and IPv6 multicast addresses needs to be established to represent one same multicast activity in two networks. A header of a multicast packet is converted according to the mapping relationship and support of a relevant application protocol, for example, an ALG (application layer gateway, Application Layer Gateway) protocol, is needed, so as to accomplish multicast interworking.

However, this IPv4-IPv6 multicast protocol has a low conversion performance, and cannot support large-scale multicast applications.

SUMMARY

An embodiment of the present invention provides a method for implementing communication between different networks, where the different networks include a first network and a second network, the first network supports a first network protocol, the second network supports a second network protocol, and the first network protocol is different from the second network protocol. The method includes:

receiving, by a multicast proxy apparatus, a multicast data obtaining request supporting the first network protocol, and determining multicast data identity information MDID of multicast data that needs to be obtained, where the multicast proxy apparatus has a first network address corresponding to the first network and a second network address corresponding to the second network;

obtaining, according to the MDID, in a multicast manner and from a network device supporting the second network protocol, the multicast data that needs to be obtained, and buffering the multicast data that needs to be obtained;

establishing, for the multicast data that needs to be obtained, a multicast group supporting the first network protocol; and sending the multicast data that needs to be obtained by a user apparatus to the user apparatus which joins the multicast group supporting the first network protocol.

An embodiment of the present invention also provides a multicast proxy apparatus, where a network system in which the multicast proxy apparatus is located includes a first network supporting a first network protocol and a second network supporting a second network protocol, the first network protocol is different from the second network protocol, and the multicast proxy apparatus has a first network address corresponding to the first network and a second network address corresponding to the second network, and the multicast proxy apparatus includes:

a multicast request receiving unit, configured to receive a multicast data obtaining request supporting the first network protocol, and determine multicast data identity information MDID of multicast data that needs to be obtained;

a multicast data obtaining unit, configured to obtain, according to the MDID, in a multicast manner and from a network device supporting the second network protocol, the multicast data that needs to be obtained and buffer the multicast data that needs to be obtained;

a multicast group maintenance unit, configured to establish, for the multicast data that needs to be obtained, a multicast group supporting the first network protocol, and maintain information of the established multicast group; and a multicast sending unit, configured to send the multicast data that needs to be obtained by a user apparatus to the user apparatus which joins the multicast group supporting the first network protocol.

DETAILED DESCRIPTION

The present invention is described in detail below with reference to the accompanying drawings and specific embodiments. However, it should be noted that, the following embodiments are merely examples that help understand the technical solutions, but not intended to limit the present invention.

In a network according to an embodiment of the present invention, a first network supporting a first network protocol and a second network supporting a second network protocol exist, where the first network protocol is different from the second network protocol, and a multicast proxy apparatus simultaneously supporting the two network protocols also exists. A method for obtaining multicast data from a multicast source apparatus supporting the second network protocol by a user apparatus supporting the first network protocol is as follows:

sending, by the user apparatus supporting the first network protocol and according to a first network IP address of the multicast proxy apparatus, a multicast data obtaining request supporting the first network protocol to the multicast proxy apparatus, where the multicast data obtaining request includes multicast data identity information (Multicast Data Identity, MDID) used for determining multicast data that the user apparatus requests to obtain. For example, the MDID includes, but is not limited to, a uniform resource locator (Uniform Resource Locator, URL) of the multicast data;

sending, by using a second network IP address of the multicast proxy apparatus and the MDID, a multicast data obtaining request supporting the second network protocol to the multicast source apparatus supporting the second network protocol;

storing the obtained multicast data in a storage medium, allocating a first network multicast address for the multicast data, and sending the first network multicast address to the user apparatus; and joining, by the user apparatus, a corresponding multicast group according to the first network multicast address to obtain the multicast data that is needed.

For example, in this embodiment, the first network and the second network may be an IPv4 network and an IPv6 network respectively, or may be an IPv6 network and an IPv4 network respectively, and may also be networks of other protocol types.

In a network according to an embodiment of the present invention, a first network and a second network of different network protocols and a multicast proxy apparatus simultaneously supporting the two networks exist. Further, a user apparatus supporting a first network protocol exists in the first network, and a multicast source apparatus supporting a second network protocol exists in the second network. The user apparatus obtains multicast data according to a corresponding relationship between an MDID maintained by the multicast proxy apparatus and a first network multicast address allocated for the requested multicast data, and a specific method is as follows:

sending, by the user apparatus, a multicast data obtaining request to the multicast proxy apparatus according to a first network IP address of the multicast proxy apparatus, where the multicast data obtaining request includes multicast data identity information (Multicast Data ID, MDID) used for determining multicast data that the user apparatus requests to obtain. For example, the MDID includes, but is not limited to, a uniform resource locator (URL) of the multicast data;

detecting whether the multicast proxy apparatus maintains a corresponding relationship between the MDID and the first network multicast address allocated for the requested multicast data, that is, whether the multicast proxy apparatus has a multicast group of the multicast data that needs to be obtained by the user apparatus, where the multicast group supports the first network protocol, and specifically, a method for maintaining the corresponding relationship may be: maintaining a table entry corresponding to the MDID, where the table entry includes the corresponding relationship between the MDID and the first network multicast address allocated for the requested multicast data;

if the corresponding relationship is not maintained, sending, by using a second network IP address of the multicast proxy apparatus and the MDID, a multicast data obtaining request supporting the second network protocol to the multicast source apparatus supporting the second network protocol;

buffering the obtained multicast data in a storage medium, and maintaining the corresponding relationship between the MDID of the multicast data and the first network multicast address allocated for the requested multicast data, that is, establishing a multicast group which uses the multicast data that needs to be obtained by the user apparatus as multicast content and supports the first network protocol, and sending, to the user apparatus, the multicast address which supports the first network protocol and is in the corresponding relationship;

if the corresponding relationship is maintained, sending the first network multicast address corresponding to the MDID to the user apparatus; and joining, by the user apparatus and according to the first network multicast address, the corresponding multicast group supporting the first network protocol to obtain the multicast data that is needed.

For example, in this embodiment, the first network and the second network may be an IPv4 network and an IPv6 network respectively, or may be an IPv6 network and an IPv4 network respectively, and may also be networks of other protocol types.

Figure 1:
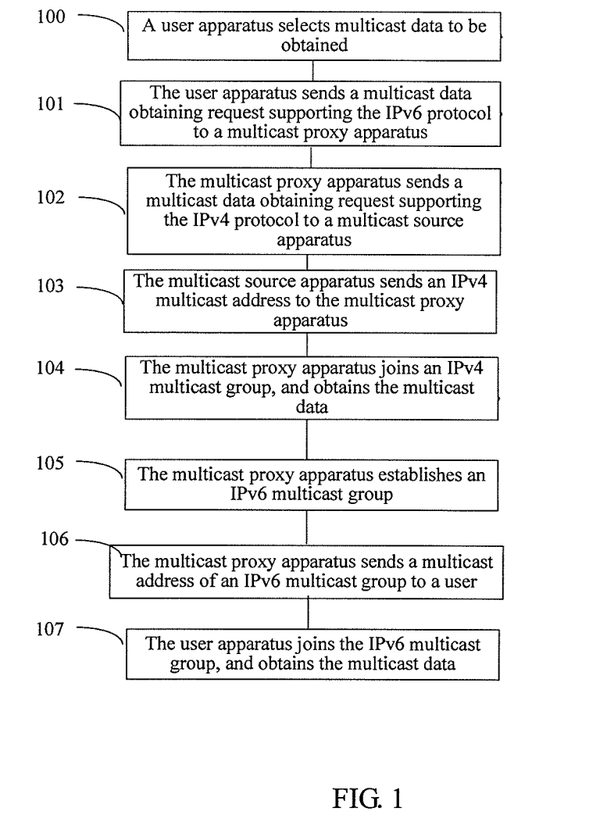
FIG. 1 is a flow chart of obtaining multicast data by a user apparatus according to an embodiment of the present invention.

FIG. 1 is a flow chart of obtaining multicast data by a user apparatus according to an embodiment of the present invention. As shown in FIG. 1, a first network supporting a first network protocol and a second network supporting a second network protocol coexist in a network system. For example, the first network is an IPv6 network and the second network is an IPv4 network, or the first network is an IPv4 network and the second network is an IPv6 network. The first network and second network may also be other networks respectively. It is taken as an example that the first network and the second network are respectively the IPv6 network and the IPv4 network, where a user apparatus supporting the IPv6 protocol is in the IPv6 network, a multicast source apparatus supporting the IPv4 protocol is in the IPv4 network, and a multicast proxy apparatus supports the IPv4 protocol and the IPv6 protocol simultaneously, and has an IPv4 address and an IPv6 address, and the method includes:

100: A user apparatus which supports the IPv6 protocol and is in an IPv6 network selects multicast data that needs to be obtained, for example, may perform selection according to an electronic program guide (EPG).

101: The user apparatus sends a multicast data obtaining request which includes multicast data identity information and supports the IPv6 protocol to the multicast proxy apparatus, where a target address of the request is an IPv6 address of the multicast proxy apparatus, and for example, the multicast data identity information may be a multicast data URL.

102: The multicast proxy apparatus sends a multicast data obtaining request supporting the IPv4 protocol to the multicast source apparatus that is in an IPv4 network, where the multicast data obtaining request takes an IPv4 address of the multicast proxy, apparatus as a source address, an IPv4 address of the multicast source apparatus as a destination address, and includes the MDID of the multicast data that needs to be obtained.

103: The multicast source apparatus sends an IPv4 multicast address of the multicast data to the multicast proxy apparatus after receiving the multicast data obtaining request supporting the IPv4 protocol.

104: The multicast proxy apparatus uses its IPv4 address to join a multicast group corresponding to the IPv4 multicast address, and receives, from the multicast source apparatus, the multicast data that needs to be obtained.

105: The multicast proxy apparatus allocates, for the obtained multicast data, an IPv6 address used for establishing a multicast group, maintains a corresponding relationship between the IPv6 address used for establishing the multicast group and the MDID, and establishes a multicast group supporting the IPv6 protocol by using the IPv6 address used for establishing the multicast group as a multicast address and the obtained multicast data as multicast content.

106: The multicast address of the multicast group supporting the IPv6 protocol is sent to the user apparatus that is in the IPv6 network and supports the IPv6 protocol.

107: The user apparatus joins a multicast group corresponding to the IPv6 multicast address to obtain, from a storage medium, the multicast data that it requests to obtain.

In this embodiment, the user apparatus supporting the IPv6 protocol is in the IPv6 network, while the multicast source apparatus supporting the IPv4 protocol is in the IPv4 network. The present invention is also applicable to the case of multicast data transmission performed between the user apparatus which supports the IPv4 protocol and is in the IPv4 network and the multicast source apparatus which supports the IPv6 protocol and is in the IPv6 network, which is not described in detail here.

Figure 2:
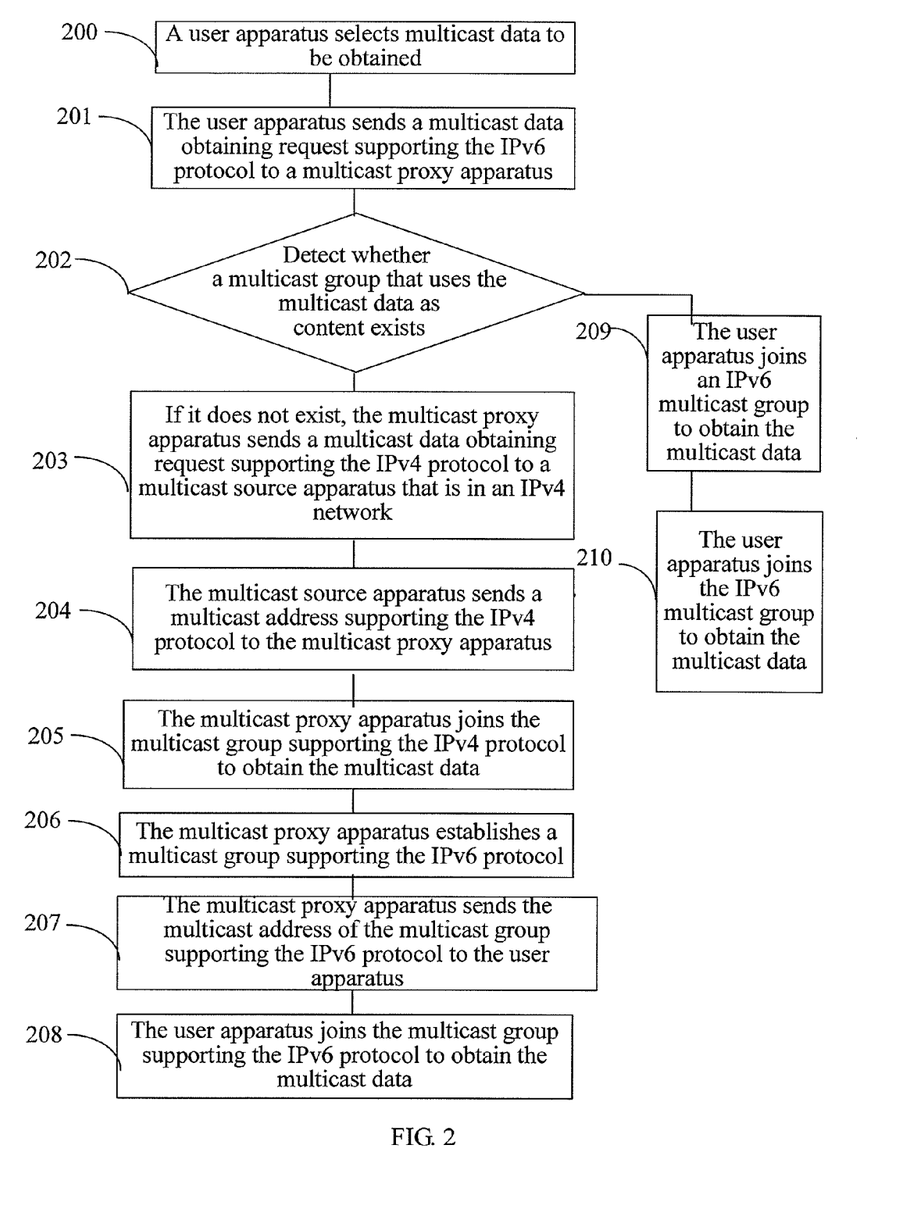
FIG. 2 is a flow chart of obtaining multicast data by a user apparatus according to an embodiment of the present invention.

FIG. 2 is a schematic diagram of a method for obtaining multicast data by a user apparatus according to an embodiment of the present invention. As shown in FIG. 2, an IPv4 network and an IPv6 network coexist in a network system, a first network is the IPv6 network, a second network is the IPv4 network, where a user apparatus supporting the IPv6 protocol is in the IPv6 network, a multicast source apparatus supporting the IPv4 protocol is in the IPv4 network, and a multicast proxy apparatus supports the IPv4 protocol and the IPv6 protocol simultaneously, and has an IPv4 address and an IPv6 address, and the method includes:

200: A user apparatus which supports the IPv6 protocol in an IPv6 network selects multicast data that needs to be obtained, for example, may perform selection according to an electronic program guide (EPG).

201: The user apparatus sends a multicast data obtaining, request supporting the IPv6 protocol, for example, may send multicast data identity information, such as a multicast data URL, to the multicast proxy apparatus according to an IPv6 address of the multicast proxy apparatus.

202: The multicast proxy apparatus detects whether the IPv6 network maintains a corresponding relationship between the multicast data identity information and an IPv6 multicast address allocated for the requested multicast data, that is, detects whether the IPv6 network maintains a multicast group that uses the multicast data to be obtained as data content and supports the IPv6 protocol; if not, 203 is executed, and if yes, 209 is executed.

203: If the corresponding relationship between the multicast data identity information and the IPv6 multicast address, that is, the multicast group which corresponds to the multicast data to be obtained and supports the IPv6 protocol, does not exist, the multicast proxy apparatus sends a multicast data obtaining request supporting the IPv4 protocol to a multicast source apparatus which supports the IPv4 protocol and is in an IPv4 network, where the multicast data obtaining request supporting the IPv4 protocol takes an IPv4 address of the multicast proxy apparatus as a source address, an IPv4 address of the multicast source apparatus as a destination address, and includes the identity information of the multicast data to be obtained, for example, a URL.

204: After receiving the multicast data obtaining request supporting the IPv4 protocol, the multicast source sends an IPv4 multicast address of the multicast data to the multicast proxy apparatus.

205: The multicast proxy apparatus uses its IPv4 address to join a multicast group corresponding to the IPv4 multicast address, and receives, from the multicast source apparatus, the multicast data that needs to be obtained.

206: The received multicast data is stored in a storage medium, an IPv6 multicast address is allocated for the multicast data, and a corresponding relationship between the multicast data identity information and the multicast address supporting the IPv6 protocol is established and maintained.

207: The multicast proxy apparatus sends, according to the corresponding relationship, an IPv6 multicast address corresponding to the multicast data to be obtained to the user apparatus.

208: The user apparatus joins the multicast group according to the IPv6 multicast address, and requests to obtain the multicast data in the multicast group, and the multicast proxy apparatus sends the multicast data which the user apparatus requests to obtain to the user apparatus that joins the multicast group.

209: If the corresponding relationship between the multicast data identity information and the IPv6 multicast address, that is, the multicast group exists, the multicast proxy apparatus sends the IPv6 multicast address corresponding to the multicast data identity information to the user apparatus that is in the IPv6 network.

210: The user apparatus joins the multicast group according to the IPv6 multicast address, and requests to obtain the multicast data in the multicast group, and the multicast proxy apparatus sends the multicast data which the user apparatus requests to obtain to the user apparatus that joins the multicast group.

In this embodiment, the user apparatus supporting the IPv6 protocol is in the IPv6 network, while the multicast source apparatus supporting the IPv4 protocol is in the IPv4 network. The present invention is also applicable to a case of multicast data transmission performed between the user apparatus which supports the IPv4 protocol and is in the IPv4 network and the multicast source apparatus which supports the IPv6 protocol and is in the IPv6 network, which is not described in detail here.

An embodiment of the present invention provides a multicast proxy apparatus. The multicast proxy apparatus supports a first network and a second network of different network types simultaneously, where a user apparatus is in the first network, and a multicast source is in the second network. The first network and the second network may be an IPv6 network and an IPv4 network respectively, and may also be an IPv4 network and an IPv6 network respectively, and may also be networks of other types respectively.

After receiving a multicast data obtaining request sent by the user apparatus that is in the first network, the multicast proxy apparatus uses its second network address to send the multicast data obtaining request to the multicast source apparatus that is in the second network. The multicast proxy apparatus allocates a first network multicast address for the multicast data after receiving the multicast data that is sent by the multicast source apparatus to it. The proxy apparatus sends the first network multicast address to the user apparatus, so that the user apparatus joins a multicast group corresponding to the first network multicast address to obtain, from a storage medium, the multicast data which it requests to obtain.

Figure 3:
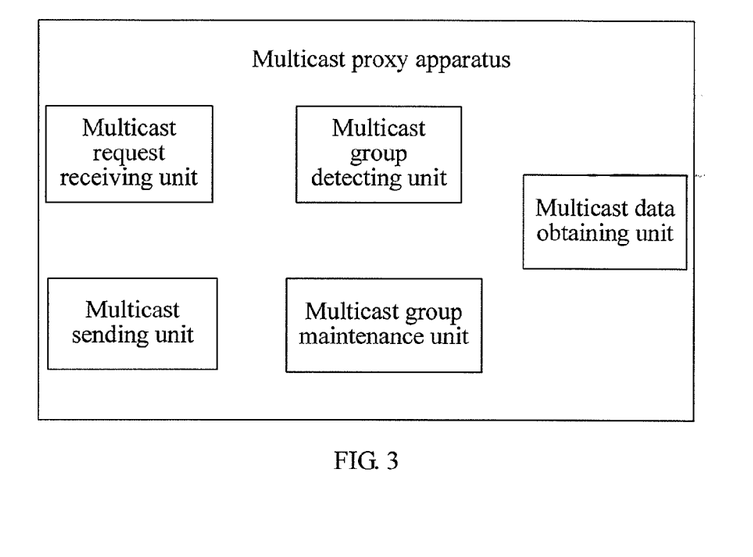
FIG. 3 is a schematic diagram of a multicast proxy apparatus according to an embodiment of the present invention.

FIG. 3 is a schematic diagram of a multicast proxy apparatus according to an embodiment of the present invention. A network system in which the multicast proxy apparatus is located includes a first network supporting a first network protocol and a second network supporting a second network protocol, where the first network protocol is different from the second network protocol, and the multicast proxy apparatus has a first network address corresponding to the first network and a second network address corresponding to the second network. The protocols of the first network and the second network may be the IPv6 protocol and the IPv4 protocol respectively, and may also be the IPv4 protocol and the IPv6 protocol respectively, and may also be networks of other protocols respectively.

As shown in FIG. 3, the multicast proxy apparatus specifically includes: a multicast request receiving unit, a multicast data obtaining unit, a multicast group maintenance unit, and a multicast sending unit.

In this embodiment, the first network protocol is the IPv6 protocol, while the second network protocol is the IPv4 protocol.

When multicast proxy is performed, the multicast proxy apparatus receives, through the multicast request receiving unit, a multicast data obtaining request which supports the IPv6 protocol and is sent by a user apparatus which supports the IPv6 protocol and is in the first network. For example, the multicast data obtaining request includes multicast data identity information (MDID) of multicast data to be obtained by the user apparatus, where the MDID may be a URL, and may also be other identity information.

After the multicast proxy apparatus receives the multicast data obtaining request supporting the IPv6 protocol, the multicast data obtaining unit obtains, according to the MDID in the multicast data obtaining request supporting the IPv6 protocol, in a multicast manner and from a network device supporting the second network protocol, the IPv4 protocol in this embodiment, the multicast data that needs to be obtained, and buffers the multicast data that needs to be obtained.

After the multicast data that needs to be obtained is obtained from the network device supporting the IPv4 protocol, the multicast group maintenance unit establishes, for the multicast data that needs to be obtained, a multicast group supporting the first network protocol, the IPv6 protocol in this embodiment, and maintains information of the established multicast group.

The multicast sending unit sends the multicast data that needs to be obtained by the user apparatus to the user apparatus which supports the first network protocol and joins the multicast group that supports the first network protocol.

Further, the multicast data obtaining unit includes a multicast address requesting subunit, a multicast address receiving subunit and a multicast data receiving subunit.

Specifically, the multicast address requesting subunit in the multicast data obtaining unit takes a second network address of the multicast proxy apparatus as a source address, an address of a multicast source apparatus that is in the second network as a destination address, and sends a multicast data obtaining request including the MDID to the multicast source apparatus, where the multicast data obtaining request is a multicast data obtaining request supporting the second network protocol.

The multicast address receiving subunit in the multicast data obtaining unit receives a multicast address corresponding to the MDID, where the multicast address corresponding to the MDID is a second network multicast address which corresponds to the MDID and is determined by the multicast source apparatus according to the MDID in the multicast data obtaining request after the multicast data obtaining request is received.

After the multicast address is received, the multicast data receiving subunit in the multicast data obtaining unit joins the corresponding multicast group of the multicast source apparatus, receives the multicast data which is in the multicast source apparatus and corresponds to the MDID, and buffers the received multicast data sent by the multicast source apparatus locally or in a dedicated storage medium.

Further, the multicast group maintenance unit includes a multicast group establishing subunit and a multicast group updating subunit.

Specifically, the multicast group establishing subunit establishes, for the multicast data that needs to be obtained, the multicast group supporting the first network protocol after the multicast proxy apparatus receives and buffers the multicast data corresponding to the MDID, that is, the multicast data that needs to be obtained by the user apparatus which supports the first network protocol. The multicast group supporting the first network protocol refers to a multicast group established by the multicast group maintenance unit by using the network address of the first network as the multicast address, so that the user apparatus supporting the first network protocol may join the multicast group to obtain the multicast data.

The multicast group updating subunit also needs to update information of the currently existing multicast group supporting the first network protocol, for example, a corresponding relationship between data content and the multicast address of each multicast group, or a corresponding relationship between multicast data identity information and the multicast address of each multicast group.

Further, the multicast sending unit includes a multicast address sending subunit and a multicast data sending subunit.

Specifically, the multicast address sending subunit in the multicast sending unit sends, according to a source address of the data obtaining request supporting the first network protocol, the multicast address of the multicast group supporting the first network protocol to the user apparatus sending the request.

After the user apparatus supporting the first network protocol joins the multicast group according to the multicast address supporting the first network protocol, the multicast data sending subunit in the multicast sending unit sends, in a multicast manner, the multicast data that needs to be obtained to the user apparatus which joins the multicast group, so as to finally achieve that the user apparatus supporting the first network protocol obtains, through the multicast proxy apparatus, the multicast data from the network device supporting the second network protocol.

Further, in this embodiment, the multicast proxy apparatus may also include a multicast group detecting unit. The multicast group detecting unit is configured to, after the multicast data obtaining request supporting the first network protocol is received, detect whether the multicast group that uses the multicast data to be obtained as the data content and supports the first network protocol exists.

When the multicast proxy apparatus includes the multicast group detecting unit, and when the multicast proxy apparatus receives, through the multicast request receiving unit, the multicast data obtaining request supporting the first network protocol, the multicast data is no longer directly obtained, through the multicast data obtaining unit and from the multicast source apparatus supporting the second network protocol. Instead, it is detected whether the multicast group, which supports the first network protocol and uses the multicast data that needs to be obtained by the user apparatus as the multicast content, exists in the multicast proxy apparatus.

If it does not exist, the multicast data obtaining unit, the multicast group maintenance unit and the multicast sending unit, based on their respective functions, obtain, according to the MDID of the multicast data that needs to be obtained by the user apparatus, in a multicast manner and from the multicast source device supporting the second network protocol, the multicast data that needs to be obtained, and buffer the multicast data that needs to be obtained, establish, for the multicast data that needs to be obtained, the multicast group supporting the first network protocol, and send the multicast data that needs to be obtained to the user apparatus which joins the multicast group.

If it exists, the multicast sending unit sends the multicast data that needs to be obtained to the user apparatus which joins the multicast group.

In this embodiment, the user apparatus supporting the IPv6 protocol is in the IPv6 network, while the multicast source apparatus, supporting the IPv4 protocol is in the IPv4 network. The present invention is also applicable to the case of multicast data transmission performed between the user apparatus which supports the IPv4 protocol and is in the IPv4 network and the multicast source apparatus which supports the IPv6 protocol and is in the IPv6 network, which is not described in detail here.

Persons of ordinary skill in the art may understand that: All or part of the steps in the foregoing method embodiments may be implemented by a program instructing relevant hardware. The program may be stored in a computer readable storage medium. When the program is executed, the steps in the foregoing method embodiments are executed. The storage medium includes any medium that can store program codes, such as a ROM, a RAM, a magnetic disk or a compact disk.

The foregoing descriptions are merely exemplary embodiments of the present invention, but not intended to limit the protection scope of the present invention. Any variations or replacements that may be easily thought of by persons skilled in the art within the technical scope disclosed in the present invention shall fall within the protection scope of the present invention.

What is claimed is:

1. A method for implementing communication between different networks, wherein the different networks comprise a first network and a second network, the first network supports a first network protocol, the second network supports a second network protocol, and the first network protocol is different from the second network protocol, and the method comprises:

receiving, by a multicast proxy apparatus, a multicast data obtaining request supporting the first network protocol, and determining multicast data identity information (MDID), wherein the multicast proxy apparatus has a first network address corresponding to the first network and a second network address corresponding to the second network;

obtaining, by the multicast proxy apparatus, multicast data identified by the MDID from a network device supporting the second network protocol;

generating a multicast group by buffering, by the multicast proxy apparatus, the obtained multicast data, and establishing a corresponding relationship between the MDID of the buffered multicast data and a multicast address supporting the first network protocol such that the multicast group supports the first network;

sending, by the multicast proxy apparatus, the multicast address to a user apparatus after the multicast data is buffered; and sending, by the multicast proxy apparatus, the buffered multicast data to the user apparatus after the user apparatus joins the multicast group supporting the first network protocol.

2. The method according to claim 1, wherein obtaining, by the multicast proxy apparatus, multicast data identified by the MDID from a network device supporting the second network protocol comprises:

sending a multicast data obtaining request supporting the second network protocol to a multicast source apparatus supporting the second network protocol, wherein the obtaining request comprises the MDID;

receiving a multicast address sent by the multicast source apparatus; and joining a corresponding multicast group according to the multicast address, and receiving the multicast data sent by the multicast source apparatus.

3. The method according to claim 1, wherein sending the buffered multicast data to the user apparatus after the user apparatus joins the multicast group supporting the first network protocol comprises:

according to a source address of the multicast data obtaining request supporting the first network protocol, sending the multicast address of the multicast group to the user apparatus which sends the request; and sending, in a multicast manner, the buffered multicast data to the user apparatus after the user apparatus joins the multicast group.

4. The method according to claim 3, wherein before obtaining, by the multicast proxy apparatus, multicast data identified by the MDID from a network device supporting the second network protocol, the method further comprises:

detecting whether the multicast group that uses the obtained multicast data as data content and supports the first network protocol exists; and if the multicast group that uses the obtained multicast data as the data content and supports the first network protocol does not exist, executing subsequent steps.

5. The method according to claim 1, wherein the MDID is a uniform resource locator URL.

6. The method according to claim 5, wherein the first network is an IPv4 network and the second network is an IPv6 network, or the first network is an IPv6 network and the second network is an IPv4 network respectively.

7. A multicast proxy apparatus, wherein a network system in which the multicast proxy apparatus is located comprises a first network supporting a first network protocol and a second network supporting a second network protocol, the first network protocol is different from the second network protocol, the multicast proxy apparatus has a first network address corresponding to the first network and a second network address corresponding to the second network, and the multicast proxy apparatus comprises:

> a multicast request receiving means for receiving a multicast data obtaining request supporting the first network protocol, and determining multicast data identity information (MDID) of multicast data that needs to be obtained;
>
> a multicast data obtaining means for obtaining multicast data identified by the MDID from a network device supporting the second network protocol;
>
> a multicast group maintenance means for generating a multicast group by buffering the obtained multicast data, and generating a corresponding relationship between the MDID of the buffered multicast data and a multicast address supporting the first network protocol such that the multicast group supports the first network; and
>
> a multicast sending means for sending the multicast address to a user apparatus after the multicast data is buffered and sending, after the user apparatus joins the multicast group, the buffered multicast data to the user apparatus.

8. The apparatus according to claim 7, wherein the multicast sending means comprises:

> means for sending the multicast address to the user apparatus according to a source address of the multicast data obtaining request supporting the first network protocol.

9. The apparatus according to claim 8, wherein the multicast proxy apparatus further comprises: a multicast group detecting means for detecting, after the multicast request receiving means receives the multicast data obtaining request supporting the first network, whether the multicast group that uses the buffered multicast data as data content and supports the first network protocol exists.

10. A non-transitory computer-readable medium comprising instructions causing an apparatus, when the instructions are executed by the apparatus, to:

> receive a multicast data obtaining request supporting a first network protocol;
>
> determine, based on the multicast data obtaining request, multicast data identity information (MDID);
>
> obtain multicast data identified by the MDID from a network device supporting a second network protocol;
>
> generate a multicast group by buffering, by the multicast proxy apparatus, the obtained multicast data, and establish a corresponding relationship between the MDID of the buffered multicast data and a multicast address supporting the first network protocol such that the multicast group supports the first network;
>
> send a user apparatus the multicast address after the multicast data buffered; and
>
> send the buffered multicast data to the user apparatus after the user apparatus joins the multicast group.

* * * * *